Sept. 16, 1969        D. C. JAMES        3,467,079
GALL BLADDER AND COMMON DUCT RETRACTOR
Filed April 14, 1967        2 Sheets-Sheet 1
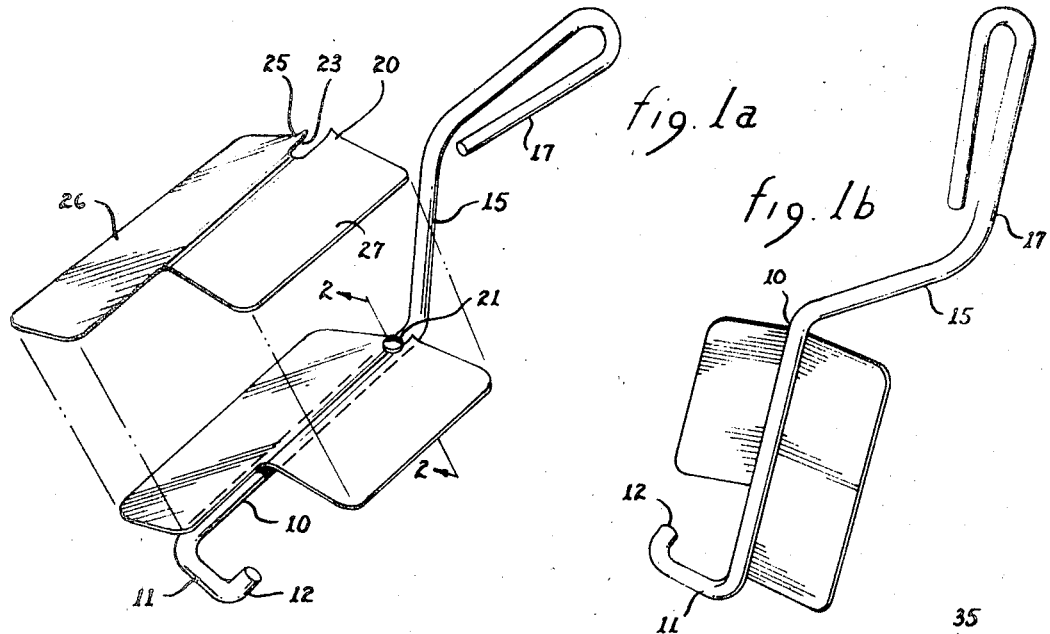
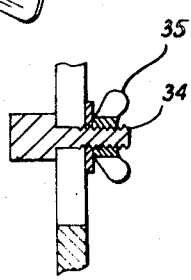
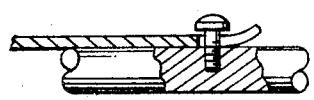
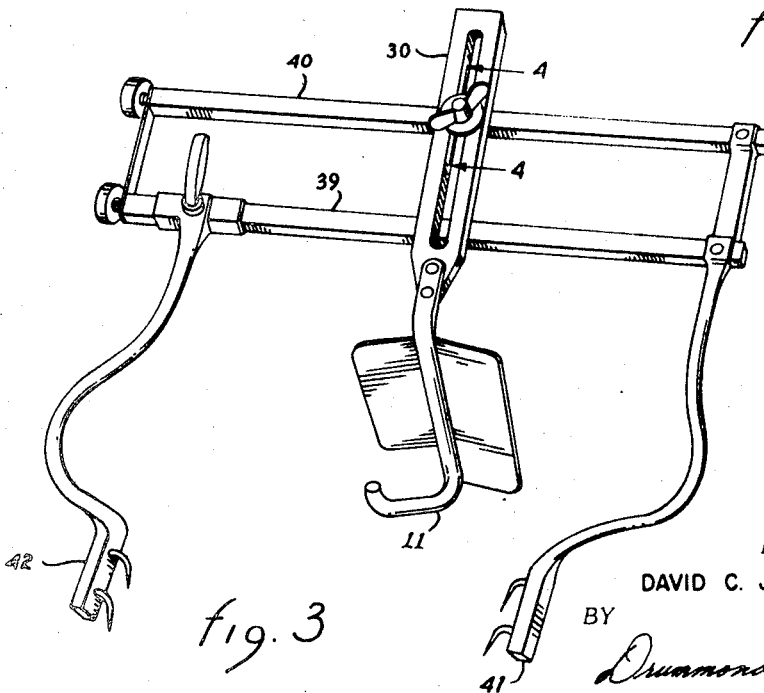
INVENTOR.
DAVID C. JAMES
BY
Drummond & Cahill
ATTORNEYS INVENTOR.
DAVID C. JAMES
BY
Drummond & Cahill
ATTORNEYS United States Patent Office 3,467,079
Patented Sept. 16, 1969

3,467,079
GALL BLADDER AND COMMON DUCT RETRACTOR
David Charles James, 926 E. McDowell Road, Phoenix, Ariz. 85006
Filed Apr. 14, 1967, Ser. No. 630,908
Int. Cl. A61b *1/00*
U.S. Cl. 128—20     6 Claims

ABSTRACT OF THE DISCLOSURE

A retractor including a shaft and a retractor blade removably secured thereto. The shaft terminates in a hook and the retractor blade is divided into two wings when connected to the retractor shaft. The hook is shaped to extend into the Foramen of Winslow to permit the pivoting of the retractor and the placement of pressure by the retractor blade to assist the placing of the gall bladder and common duct in an appropriate operative field.

Background of the invention

The present invention relates to retractors, and more specifically, to a retractor for assisting the positioning of the gall bladder and common duct with a minimum of manipulation and interference. Prior art operative techniques concerning the gall gladder and common duct have usually included a procedure requiring an assistant surgeon's placement of a sponge in the lower portion of the operating field to retract the transverse colon and duodenum and displace them caudad (toward the foot of the patient). This operative procedure requires the continuous effort on behalf of the assistant surgeon and, in view of the placement of the assistant surgeon's hand and the sponge, results in interference with free movement in the operative area and may limit the view of some organs.

In those instances wherein the operation is by rectus incision, it is common to use a Balfour retractor for the abdominal wall. In such instances, the same procedure is followed in regard to the utilization of a sponge or moist laparotomy pack to hold and displace certain exposed organs. The Balfour retractor includes a blade to maintain exposure of the operative area and retract the abdominal wall; however, the retractor blade does not assist the displacement of the organs to expose the gall bladder or common duct.

It is therefore an object of the present invention to provide a retractor that may conveniently be used to maintain the displacement of organs such as the transverse colon and duodenum.

It is another object of the present invention to provide a retractor that, while maintaining displacement of organs out of the operating field, will assist in pulling the common duct into the operating field.

It is still another object of the present invention to provide a retractor that may be used in combination with a Balfour retractor to free an assistant surgeon's hand and thereby permit more efficient utilization of the assistant's services.

It is a further object of the present invention to provide a retractor that may be inserted into the Foramen of Winslow and pivoted to simultaneously draw the gall bladder and common duct into the operating field and maintain displacement of the transverse colon and duodenum to more completely expose the common duct.

Summary of the invention

Briefly, in accordance with one embodiment of the present invention, a gall bladder and common duct retractor is provided having a retractor shaft terminating at one end thereof in a hook. The hook is shaped to conveniently be inserted into the Foramen of Winslow. A retractor blade is removably secured to the retractor shaft to permit the blade to be mounted on the shaft after the hook is in place in the Foramen of Winslow. The retractor blade is divided into two wings by the retractor shaft, one wing extending along the shaft and terminating opposite the hook. The second wing is shorter to permit attachment of the blade to the retractor shaft after the hook is in place in the Foramen of Winslow.

Brief description of the drawings

The present invention may more readily be described by reference to the accompanying drawings, in which:

FIGURES 1a and 1b are perspective illustrations of a retractor constructed in accordance with the teachings of the present invention.

FIGURE 2 is a sectional view of FIGURE 1a taken along line 2—2.

FIGURE 3 is a perspective view of another embodiment of the retractor of the present invention showing the attachment of the retractor to a Balfour retractor.

FIGURE 4 is a cross-sectional view of FIGURE 3 taken along line 4—4.

Description of the preferred embodiments

Figure 5:
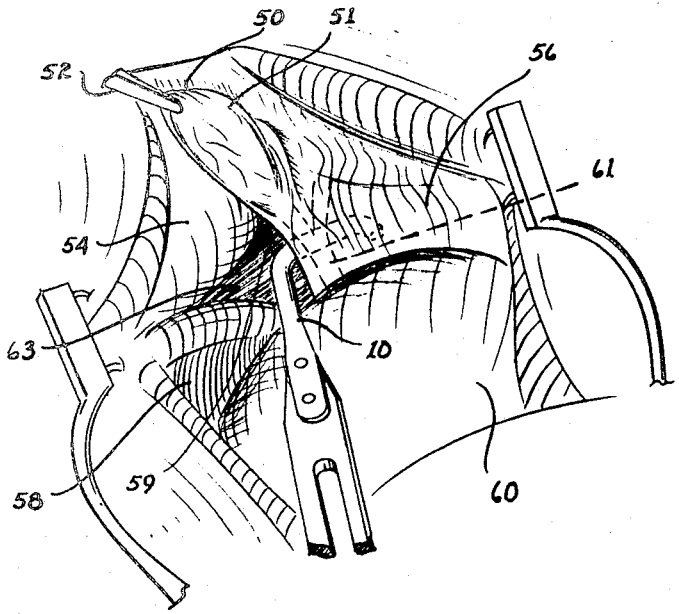
FIGURE 5 is a pictorial illustration showing a retractor of the present invention after the hook thereof has been inserted in the Foramen of Winslow.

Referring now to FIGURES 1a, 1b, and 2, the retractor includes a retractor shaft 10 terminating at one end thereof in a retractor hook 11. It may be noted that the hook extends from the retractor shaft 10 at approximately a 90 degree angle and that the hook forms a plane with the retractor shaft although the tip 12 of the hook is bent to slightly extend out of that plane. A shaft extension 15 extends at an angle from the retractor shaft and terminates in a handle 17. The angle between the shaft extension 15 and the shaft 10 may vary but has been found to be effective when about 70 degrees. A retractor blade 20 is provided and is removably secured to the retractor shaft by a stud or screw 21 threaded into the retractor shaft. It may be noted that to permit the quick and easy attachment of the blade to the shaft, the blade is provided with a notch 23 that may be slid under the head of the screw 21, the head of the screw remaining slightly displaced from the shaft. The edge of the retractor blade shown at 25 may be slightly bent so that when the blade is positioned on the retractor shaft, the blade will not readily become disengaged since the edge 25 will interfere with the head of the screw 21 thus preventing accidental removal.

The retractor blade is divided into two wings 26 and 27 by the retractor shaft. The blade, although slightly concave when viewed from the retractor shaft side, extends in a plane approximately parallel to the plane formed by the retractor shaft 10 and the hook 11. The wing 27 extends along the retractor shaft 10 but terminates short of the retractor hook 11 or hook tip 12. The wing 26 extends along the retractor shaft 10 and terminates opposite the hook 11.

Referring now to FIGURES 3 and 4, another embodiment of the present invention is shown. The retractor shaft 10, hook 11, hook tip 12, and retractor blade 20 are identical to the embodiment shown and described in the preceding figures. However, the shaft extension 30 of the embodiment shown in FIGURES 3 and 4 forms an adapter handle comprising a flat elongated member having a longitudinal slot 31 therein. The slot is adapted to receive a threaded stud 34 having a wing nut 35 thereon. The embodiment thus shown permits the utilization of the retractor of the present invention with a Balfour retractor. The Balfour retractor comprises a pair of curved arms 37 and 38 extending from a pair of parallel rods 39 and 40 and terminating in hook-supporting extensions 41 and 42, respectively. The extensions 41 and 42 each support a plurality of hooks 44 that extend downwardly to engage and retract the abdominal wall adjacent an incision. The arms 37 and 38 are adjustably spaced through the utilization of a sliding clamp 45 that may be tightened at any desired position on the rod 39. The adapter handle 30 of the retractor of the present invention is positioned over the rods 39 and 40; the stud 34 is clamped to the rod 40 and extends through the longitudinal slot 31 of the adapter handle. Thus, the adapter handle may be securely held by tightening the wing nut 35, thus effectively making the retractor of the present invention an integral extension of the Balfour apparatus. It may be noted that conventional Balfour retractors include a spoon-type blade intended to hold the abdominal wall adjacent the incision caudad and that this retractor is not used when the retractor of the present invention is attached to the Balfour apparatus as shown.

Figure 6:
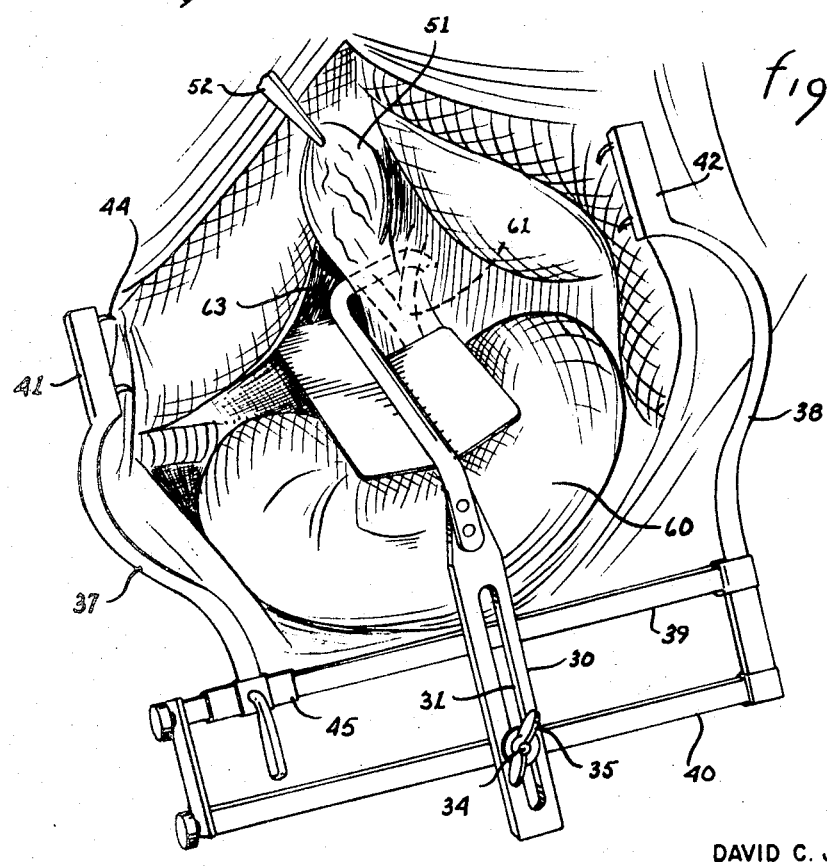
FIGURE 6 is a pictorial illustration of one embodiment of the present invention in situ and secured to a Balfour retractor.

The use of the apparatus of the present invention may be described by reference to FIGURES 5 and 6. In FIGURE 5, a right rectus incision has been made and the arms 37 and 38 of a Balfour retractor have been placed to maintain the displacement of the abdominal wall and rectus muscles to permit entry to the operating area. The fundus 50 of the gall bladder 51 has been grasped by the clamp 52 and withdrawn to the position shown. The liver 54 is exposed and the hepatoduodenal ligament 56 is shown. The transverse colon 58 and the duodenum 59 have been displaced caudad by a moist laparotomy pack 60. The common duct 61 is shown in dotted lines since it is covered by tissue such as the hepatoduodenal ligament. In FIGURE 5, it may be seen that the retractor shaft 10 is nearly vertical and that the hook 11 is mostly hidden behind the common duct 61 and the hepatoduodenal ligament. In the position shown, the hook has been inserted in the Foramen of Winslow 63. Placement of the hook in the position shown is preceded by the insertion of the surgeon's left index finger into the Foramen of Winslow to guide the hook into the Foramen and to elaborate the Foramen in the event of adhesions from previous inflammations. With the retractor shaft and hook in the position shown in FIGURE 5, the surgeon then inserts the retractor blade and attaches it to the shaft by sliding the notch in the blade under the head of the screw 21 (FIGURE 1a). The assembled retractor is then rotated or pivoted downwardly to a position such as shown in FIGURE 6 against the laparotomy pack, thus displacing the transverse colon and duodenum caudad. The adapter handle 30 is positioned over the rod 40 of the Balfour retractor and the wing nut 35 tightened to secure the retractor in place. The pivoting or rotating of the retractor from the position shown in FIGURE 5 to that shown in FIGURE 6 is accompanied by traction by the assistant surgeon downwardly toward the patient's left hip with care being maintained to hold the retractor down against the lumbar spine and into the depths of the operative field. The operation may then continue in the usual manner without the necessity of the assistant surgeon maintaining displacement of the transverse colon and duodenum with the laparotomy pack.

At the conclusion of the operation, the removal of the retractor is substantially the reverse of that described for its placement. The retractor blade is conveniently detached from the retractor shaft by merely sliding the blade axially of the shaft to disengage the notch 23 from the screw 21.

It may be seen by those skilled in the art that the retractor effectively relieves the assistant surgeon for other duties while reducing the apparatus near the operative field to a minimum. In those instances where the abdominal wall is entered through a subcostal incision, the Balfour retractor need not be used and the embodiment of the invention illustrated in FIGURES 1a and 1b may be used by the surgeon and held by the assistant surgeon to more effectively displace the transverse colon and duodenum and maintain the displacement with a minimum of bulk in the operative area. Both embodiments facilitate the withdrawal of the common duct and lower portions of the gall bladder into the operative field and especially facilitate the positioning of the common duct.

It will also be apparent to those skilled in the art that many modifications may be made in the retractor of the present invention without departing from the spirit and scope thereof; it is therefore intended that the present invention be limited only by the scope of the claims appended hereto.

I claim:

1. A gall bladder and common duct retractor comprising: a retractor shaft terminating at one end thereof in a hook; a retractor blade; means securing said blade to said retractor shaft in a plane approximately parallel to a plane formed by said retractor shaft and said hook; said retractor blade divided into first and second wings by said retractor shaft, the first of said wings extending from said shaft on the same side thereof as said hook; said first wing being shorter, measured along said shaft, than said second wing.

2. The combination set forth in claim 1 wherein said second wing extends along said retractor shaft and terminates opposite said hook, and said first wing extends along said retractor shaft and terminates short of said hook.

3. The combination set forth in claim 1 wherein said retractor blade is removably secured to said retractor shaft.

4. The combination set forth in claim 3 wherein said retractor blade includes a notch therein for slidably engaging a stud extending from said retractor shaft to thereby removably secure said retractor blade to said retractor shaft.

5. The combination set forth in claim 1 including a retractor shaft extension extending at an angle from said retractor shaft and terminating in a handle portion.

6. Combination set forth in claim 1 including a retractor shaft extension extending at an angle from said retractor shaft and terminating in an adapter handle, said adapter handle comprising an elongated member having a longitudinal slot therein for receiving a threaded stud to permit the retractor to be slidably adjustably secured to a Balfour retractor.

References Cited

UNITED STATES PATENTS

| | | | |
|---|---|---|---|
| 853,031 | 5/1907 | Prentis | 128—17 |
| 1,465,259 | 8/1923 | Friedman | 128—20 |
| 2,765,785 | 10/1956 | Pagoto | 128—15 |

RICHARD A. GAUDET, Primary Examiner

KYLE L. HOWELL, Assistant Examiner

U.S. Cl. X.R.

128—303